United States Patent [19]

Bendel

[11] 3,900,708

[45] Aug. 19, 1975

[54] SELECTIVE ECHO SUPPRESSOR

[75] Inventor: Hermann Bendel, Munich, Germany

[73] Assignee: Siemens Aktiengesellschaft, Berlin and Munich, Germany

[22] Filed: Apr. 5, 1973

[21] Appl. No.: 348,207

Related U.S. Application Data

[63] Continuation of Ser. No. 240,294, March 31, 1972.

[52] U.S. Cl. ........ 179/170.2; 179/170.4; 179/170.6

[51] Int. Cl. ........ H04b 3/20

[58] Field of Search ........ 179/170.2, 170.6, 17.8

[56] References Cited

UNITED STATES PATENTS

| | | | |
|---|---|---|---|
| 3,128,353 | 4/1964 | Gardner | 179/170.6 |
| 3,305,646 | 2/1967 | Brady | 179/170.2 |
| 3,483,335 | 12/1969 | Piotrowski | 179/170.8 |
| 3,567,873 | 3/1971 | Peroni | 179/170.2 |

*Primary Examiner*—Ralph D. Blakeslee
*Attorney, Agent, or Firm*—Hill, Gross, Simpson, Van Santen, Steadman, Chiara & Simpson

[57] ABSTRACT

Selective echo suppression is provided in a four-wire transmission system. The voice frequency band is divided into a plurality of partial frequency ranges and the transmission of an echo in a partial frequency range is controlled by the reception of signals within that partial frequency range on the receiving side of an echo suppressor. Resetting of suppression is delayed for a time corresponding to the transit time of an echo between the distant end of a four-wire telephone connection. Speech clipping upon initial speech, or upon interruptions by the other party, are eliminated or minimized.

21 Claims, 10 Drawing Figures

INVENTOR
Herman Bendel

BY Hill, Sherman, Meroni, Gross & Simpson ATTYS.

INVENTOR
Herman Bendel
BY Hill, Sherman, Meroni, Gross & Simpson
ATTYS.

INVENTOR
Herman Bendel

BY Hill, Sherman, Meroni, Gross & Simpson
ATTYS

INVENTOR
Herman Bendel

BY Hill, Sherman, Meroni, Gross & Simpson
ATTYS.

INVENTOR
Herman Bendel

BY Hill, Sherman, Meroni, Gross & Simpson
ATTYS.

INVENTOR
Herman Bendel

BY Hill, Sherman, Meroni, Gross & Simpson

ATTYS.

SELECTIVE ECHO SUPPRESSOR

This is a continuation, of application Ser. No. 240,294, filed Mar. 31, 1972.

BACKGROUND OF THE INVENTION

1. Field of the Invention

This invention relates to an echo suppressor for a telephone circuit based on a four-wire transmission system with a transmitting and a receiving path as well as at least one transfer onto a two-wire transmission path, having a first set of filters connected to the transmitting path which is controlled by the speech signal of the receiving path over a second filter set which serves for analyzing and which includes a plurality of band pass filters connected in parallel and over evaluation elements connected on the load side.

2. Description of the Prior Art

In telephone connections with greater transit time, noticeable echos may occur which are usually due to the fact that the terminations which are inserted at the transfer of four-wire to two-wire paths, insufficiently decouple the two directions of the four-wire circuit. Furthermore, echos can also come about at reflection points of the two-wire connections, for instance in the subscriber's set and the echos become first noticeable for the speaking subscriber being delayed for the double transit time of the entire telephone connection. The returning signals mostly are noticeably reflected a second time at the speaking subscriber's end of connection, so that the listening subscriber will also hear the echo. Due to this feature, the speaking subscriber will be bewildered since he means to hear utterances of his partner in the conversation, and furthermore, instantaneous values of the received signals of the listening subscriber may be covered by the echos up to an unrecognizable degree.

These disturbances get more unpleasant with longer connections, with lower transmission speed of the transmission medium, and with lower attenuation. Echo suppressors are therefore employed to suppress these disturbances. The echo suppressors are for the most part inserted into the speech paths of the two transmission directions of the four-wire connection as so-called Half-Echo-Suppressors at the respective ends of the long-distance telephone connection.

In a conventional type of echo suppressor known in the art, an evaluation device at the four-wire side of the branch connection, to which the speech signals of both directions are applied, will determine which one of the two voice current levels is dominant. If only the subscriber at the opposite end of the long-distance connection is speaking, the transmission path which is not needed at this moment is interrupted by means of a switch, so that the reflected signal cannot return to the speaking subscriber. However, to provide for the possibility that the listening subscriber to make short interruptive remarks or to start speaking himself, arrangements have been made which enable the elimination of the suppression of the transmitting paths by means of comparing the instantaneous voice current levels on both sides and/or eliminating the suppression of the transmitting path after expiration of certain given periods of delay. The utilization of such techniques, however, has caused the word beginnings of the interrupting subscriber to become garbled or partially lost.

Another principle for the elimination of speech signal reflections is known which provides sets of filters interposed in both of the task transmission directions, which sets are arranged complimentary to each other in a way that signals with frequencies for which one of the filters sets is permeable, or suppressed by the other filter set and vice-versa. Thus, the subscribers at both ends of the connection can talk at the same time and can be heard without a disturbing echo. However, with two subscribers talking at the same time and the band width evenly divided therebetween, the quality of the band width which is available for a subscriber is essentially reduced.

An arrangement with an uneven distribution of the entire band width to be transmitted, when applying the aforementioned principle, there has also become known. This arrangement contains in the position "speaking" a first set of filters with each of the two half-echo-suppressors merely in the signal path of the four-wire connection which, from the termination, is to be regarded as a transmitting path. In the position, "listening", this filter set is exchanged for a complimentary set of filters by means of a switching device. Thereby, the first set of filters has broad pass-band areas in the speech range and one or more relatively narrow suppressing ranges; the second filter set, however, has merely one or several relatively narrow pass-bands in the speech range and passes only speech signals consisting of such frequencies suppressed by the first filter set.

Due to the uneven arrangement of the entire speech band which is available during the simultaneous speaking of both subscribers, a certain improvement of the transmission quality can be obtained which, however, if one subscriber speaks by himself, still is always subject to remarkable quality limitations compared with the quality of a connection without suppression areas in the frequency band.

A type of echo suppressor in which, for the interrupting subscriber, respectively only those frequencies in the transmitting path of the interruption are suppressed which act that instant are contained essentially in his partner's speech information, is described in the Italian patent application No. 43 785 A/66 corresponding to U.S. Pat. No. 3,567,873. This type of echo suppressor employs a first set of filters in the transmitting path, with ten parallel-operating band pass filters, each being respectively for a partial frequency range of the entire speech band which is to be transmitted. A switch is connected in series to each of the band pass filters, which switch is controlled respectively by the speech signal of the receiving path, over a second set of filters which serves for analysis purposes. This second filter set is, in the same manner as the first set of filters, constructed of ten band pass filters for the same frequency ranges, operating in parallel. Evaluation elements arranged on the load side, effect that, if a given threshold is passed within a partial frequency range by the level in the receiving path, the respective switch for the same partial frequency range is opened in the transmitting path. This threshold value must, of course, be very small, so that all those speech energies in the receiving path which, after transit into the transitting path, would effect a noticeable echo, are prevented from returning to the speaking subscriber by means of the switches.

In one arrangement of the aforementioned Italian patent application, the band pass filters are respectively longitudinally inserted into the receiving path, and provided with one switch respectively seriesconnected in the same way as the band pass filters in the transmitting path. Thereby the switches of the second filter set are controlled complimentary to the switches of the first filter set. Another reason why in this arrangement the threshold value must be very small is for enabling the arriving speech signal in the receiving path to provide itself with a passage in all necessary partial frequency ranges. Due to the inertia when controlling the switches, which is always present, and due to the effect of the threshold value, however, considerable losses of transmission quality occur in this type of echo suppressor.

In this connection reference is made to the fact that the requirements of the CCITT (Comite Consultatif International Telefonique et Telegraphique) of echo suppressors sets forth, in addition to the termination transit attentuation, a requirement that a suppression attenuation of 50 db to lower the disturbing influence of the echo to a sufficient extent. To comply with this demand, in selective echo suppressors, the echo has to be lowered in each partial frequency band to at least −45 dBmO (dbm=decibel referred to 1 mw), of top speech levels of +5 dBmO are taken into account. This means practically that each partial frequency band in which the level lies above −45 dBmO at the receiving end, is entirely suppressed on the receiving end and that thus always most of the partial bands are suppressed for speaking by both subscribers at the same time.

The primary object of the present invention is thus to eliminate the drawbacks of the prior frequencies selective echo suppressors.

SUMMARY OF THE INVENTION

Proceeding from an echo suppressor in which a first filter set is connectible into the transmitting path, and controlled by the speech signal of the receiving path over a second set of filters which serves for analysis purposes, preferably comprising parallel-connected band pass filters and evaluation elements connected at their load side, the primary objective is accomplished according to the invention, by adding respectively to each individual filter of the first set of filters, and controllable attenuating or amplifying regulating unit for the respective evaluation element which may be controlled continuously or in stages.

The evaluation elements can be constructed in a way that, from a given threshold magnitude, the attenuation in the respective partial frequency ranges is controlled approximately in proportion to the respective output levels of the band pass filters of the second filter set.

By applying these measures all partial frequency bands, even those which contain nearly no speech energy, can be selectively suppressed. This results in more effective echo suppression Furthermore, these measures give an essential improvement in the intelligibility of interruptive comments by the listening subscriber for the just-speaking subscriber, since the recent attenuation of the signals of a partial frequency range always reaches only such a degree which is necessary to make the echo disturbance negligibly small. Thus, for the interrupting subscriber, or for the subscriber whos peaks simultaneously, there is always far more frequency band available than in prior selective echo suppressors.

To even out possible different sound volumes on the receiving and transmitting sides, it might be advantageous to make the threshold value for all partial frequency ranges displaceable by means of a threshold value control device connected to the input of the second set of filters, in such a way that the threshold value is lowered in certain limits with low levels in the receiving range and increased with high levels in the receiving path.

As a first set of filters, parallel-connected band pass filters, for instance, might be provided having a respective regulating unit connected in series or, band suppressors, connected in series, having the respective regulating unit connected in parallel.

It is advantageous with parallel-connected band pass filters that it is possible to adjust the suppression both easily and continuously. To prevent, however, that each echo oscillation on the transmitting end can get into the transmission path through several of the band pass filters connected in parallel, it is advantageous to dimension the band pass filters of the first set of filters to exhibit a lower band width and/or a greater steepness than the band pass filters of the second set of filters.

The further improvement of the transmission quality can be obtained in which for each partial frequency a comparison device is provided which is controlled by the output signal of the respective band pass filter of the first set of filters and that of the respective band pass filter of the second set of filters, which during the period while the output level of the second filter set is at a level which lies lower according to a given differential magnitude, controls the regulating unit for the same partial frequency band to a smaller attenuation. Thereby the given difference may be in a greater degree proportional to the transit attenuation of the transit of the termination employed.

If the speech energy in a partial frequency band comes mainly from the near subscriber, the selective suppression can be switched off, since at this instant the partial band energy of the near subscriber covers that of the far subscriber, and thus in this partial band the echo of the far subscriber cannot be noticed. By this means the transmission quality can be essentially improved when both subscribers are speaking. Therefore it is advantageous to render ineffective the hold over time provided for switching off the selective attenuation by means of the voice current of the near subscriber for the period of the interruption.

The application of several series-connected band suppressors as a first set of filters provides that each echo oscillation on the transmitting end can no longer be transmitted via several paths. In order to facilitate the realization of the regulating units respectively connected in parallel, the band pass suppressors, on their part, can consist of several band-suppresion elements with nearly the same suppression range which have a respective partial regulating unit connected therewith in parallel. Independent of the design of the first set of filters, it is advantageous to dimension the band pass filters of the second set of filters in a way that their suppression is small in the overlapping area of the two partial frequency bands. Through this arrangement, it is provided that the speech signals with frequencies lying in the overlapping range of the two filters can also safely be entirely suppressed at the transmitting end, or suppressed to a necessary extent.

The evaluation elements can be dimensioned such that the restoring of the suppression in the respective hold-over time is equal to or longer than the operation time of the echo signal from the branch point of the receiving path for the second set of filters to the evaluation elements in the transmitting path. This insures that even the last part of the echo to arrive at the transmitting end will be suppressed entirely.

Furthermore, the evaluation elements can be dimensioned such that the restoration of the attenuation in the respective partial frequency bands of the first set of filters is effected very slowly during the hold-over time duration in accordance with a time constant with a magnitude essentially greater than the hold-over time. Due to this, the attenuation can be kept at a nearly constant magnitude throughout the necessary hold-over time.

Furthermore it is advantageous when employing a comparing device to permit this device to adjust the regulating unit to a smaller or minimum attenuation, excluding the hold-over time, while the output signal of the band pass filter of the first set of filters is dominating. Due to this, not only the attenuation will be held at a nearly constant magnitude during the entire necessary hold-over time, but it will also be quickly switched off thereafter to render the partial frequency bands free to the near subscriber.

For those phases of the conversations in which only one of the two subscribers is speaking, which is the most frequently occurring phase of the conversations, a further essential quality increase of the speech transmission is obtained since a speech detector, controlled from the receiving path, controls a switch-over or transfer device in a way that a speech signal is not present in the receiving path, it shunts the first filter set in the transmitting path.

It is furthermore advantageous to also safely suppress short echo remainders or residues, if the switch-over device is dimensioned in a way that the switching to the first set of filters is effected very quickly and the switching to the bridging circuit is effected delayed for at least the period corresponding to the transit time of the echo signal from the connection point of the switch-over device and the receiving path up to the connection point of the switch-over device at the transmitting path.

In a preferred embodiment of the invention a second set of filters is inserted into the receiving path. Thereby, a switching element can be series-connected to each of the band pass filters of the second set of filters, which switching element is controlled by the respective evaluation element of the same partial frequency band. Furthermore, if the threshold value is exceeded by the output level of one of the band pass filters of the second set of filters, the switching element of this band pass filter can be controlled permeably.

By applying the foregoing measures, it is realized that the speech signal in the receiving path can only then transfer into the transmitting path when the evaluation elements are already prepared for the suppression of the echo signal. The same advantage is shown by an arrangement having a delaying element inserted into the path of the echo signal between the branch point of the receiving path from the second set of filters and the evaluation elements in the transmitting path. This delaying element is advantageously dimensioned in a way that the transit time of the echo signal between the branch point of the receiving path for the second set of filters and the evaluation elements in the transmitting path is about the same or greater than the reaction time of the evaluation elements. Even in lasting intermediate selective through-connection of the transmitting path for interruptive remarks of the listening subscriber, short echo remainders can no longer return to the speaking subscriber.

The longer lasting transient time of more narrow filters for the first set of filters allows, particularly if it has a lower band width and/or greater steepness than the band filter of the second set of filters, realization of the delay element at least partially by means of the first set of filters. Furthermore, the delaying element can be interconnected as a delay line into the transmitting or receiving path. It can also be realized by arranging a further switching arrangement ahead of the first set of filters which is controlled by a speech detector in a way that it interrupts the signal path of the first set of filters if a speech signal disappears in the receiving path that it through connects in delay when the speech signals starts in the signal path of the first set of filters.

BRIEF DESCRIPTION OF THE DRAWINGS

Other objects, features and advantages of the invention, its organization, construction and operations will be best understood from the following detailed description taken in conjunction with the accompanying drawings, in which.

DESCRIPTION OF THE PREFERRED EMBODIMENTS

Figure 1:
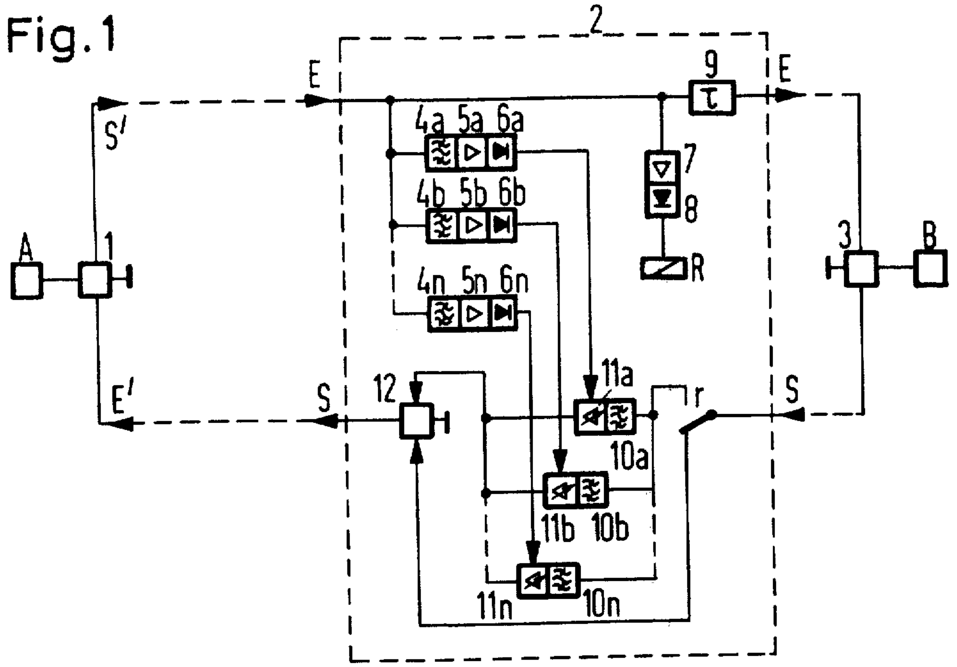
FIG. 1 is a schematic diagram of a telephone connection employing an echo suppressor according to the present invention.

In FIG. 1 a telephone long-distance connection is illustrated between the subscribers A and B. This connection extends over a two-wire circuit between the subscriber A and the two-four wire connection (hybrid) 1, as well as between the subscriber B and the two-four wire connection 3, and over a four-wire line between the two-four wire connection 1 and the two-four wire connection 3. The echo suppressor 2 is inserted within the four-wire line at the side of the subscriber B into the receiving path B and the transmitting path S of the two-four wire connection 3. There is a further echo suppressor inserted which at the side is adjacent the subscriber A into the transmitting path S' and the receiving path E' thereof, but this has not been illustrated in the drawing for purpose of simplicity and clarity. A relatively long transmission path, requiring a transit time, lies between the two echo suppressors, for instance one or several satellite or sea-cable connections. It is, however, very possible that there are also long four-wire transmission paths between an echo suppressor and the corresponding two-four wire connection.

A first set of filters is interposed into the transmission path of the four-wire connection which, with respect to the two-four wire connection 3 is to be regarded as a transmitting path S, within the echo suppressor 2, which consists of several band pass filters 10*a*, 10*b* . . . 10*n*, operating in parallel. These band pass filters, for instance, may have a band width of 300 hertz respectively, and they allow, if they are connected through, the transmission of nearly the entire speech frequency band. The interconnection is controllable continuously by means of the regulating units 11*a*, 11*b*, . . . 11*n* of which each is respectively arranged on the load side of the band pass 10. The regulating units are characterized as amplifiers which are controlled in their amplification; controlled attenuation elements, however, could be applied to a joint amplifier connected in series.

Furthermore, the input of a second set of filters is connected to the path of the four-wire transmission path, which, from the two-four wire connection 3 is to be seen as a receiving path E within the echo suppressor 2, which consists of several band pass filters, 4*a*, 4*b* . . . 4*n*, operating in parallel. These band pass filters serve for analyzing the arriving speech signal and correspond to a large degree to the band pass filters of the first set of filters in the transmission path S. An amplifier, for instance 5*a*, 5*b* . . . 5*n*, is arranged on the load side of respective filters of the second set of filters 4 and a rectifier circuit, for instance 6*a*, 6*b* . . . 6*n*. Each of these evaluation elements controls the regulating unit of the band pass filter with the same partial frequency band in the transmitting path S.

After the signal from the subscriber A in the receiving path E of the echo suppressor 2 has passed the branch point for the second set of filters, it passes a delay line 9. This delay line is to delay the speech currents so that they can only then reach the filter set of the transmitting path S when the regulating units are just adjusted to the required attenuation. The attenuations remain then adjusted when the partial band current disappears having an effect for the same period of time. Due to this, the delay line is dimensioned in a way that its delay time $\tau$ corresponds approximately to the reaction time of the evaluation elements which consist respectively of one of the amplifiers arranged on the load side, 5*a*, 5*b* . . . 5*n*, one of the rectifiers 6*a*, 6*b* . . . 6*n* and one of the regulating units 11*a*, 11*b* . . . 11*n*. Generally a delay of some milliseconds is sufficient, since essentially only the smoothing-time constant of the rectified control currents have to be taken into account. Thereby even short echo remainders are prevented from returning to the speaking subscriber A, even with every desired variation of the speech spectrum in the receiving path.

However, the transient time of the band pass filters 10*a*, 10*b* . . . 10*n* can be substracted from this reaction delay, which is important particularly when the band filters of the first set of filters are dimensioned in a way that they have a lower band width and/or a greater steepness than the band filters of the second set of filters. In this manner, the delay of the echo signal from the branch point of receiving path for the second set of filters via the two-four wire connection 3 up to the regulating units in the transmitting path S can be attained at least partially by the band filters of the first set of filters. The inlet of a speech detector is furthermore connected ahead of the delay line to the receiving path E, which consists of an amplifier 7 and a rectifier 8 connected on the load side thereof. This speech detector controls a fast operating speech relay R, having its switchover contact r inserted into the transmitting path S ahead of the first set of filters. If there is no speech signal in the receiving path E, the contact *r* switches the transmitting path S to an input of an additional two-four wire connection 12. The two-four wire connection 12 includes another input which is connected to the outputs of the regulating units 11*a*, 11*b*, . . . 11*n*. The output of the additional two-four wire connection 12 represents the outlet of the transmitting path S of the echo suppressor 2. In the place of the connection 12, a switch-over contact can also be employed. The switchover contact *r* is also replaceable by another, for instance, an electronic, shunt switch.

When the distant subscriber A is speaking band filters of the second set of filters in the termination which is associated with the subscriber B and the evaluation elements arranged on the load side, determine which partial ranges of the transmission band contain speech current and how large these speech currents are. Simultaneously, the first set of filters is inserted into the transmitting path S over the fast operating speech relay R with the help of which the echo can be selectively attenuated or suppressed. Thereby respectively only those partial ranges of the transmission band are attenuated which contain speech currents in the receiving path E. The magnitude of the attenuation therefore depends on the magnitude of the speech currents in the receiving path in such a way that from a given threshold value they are controlled almost proportionally to the respective output levels of the band pass filters of the second set of filters, in the respective partial frequency ranges. The attenuation magnitudes and the attenuated partial bands thereby change continuously according to the respective distribution of the speech spectrum in the receiving path. Partial ranges without speech currents are not attenuated.

Due to this measure, it is accordingly attained that the respective transmission path is not changed by the echo suppression as long as only one subscriber is speaking and that during simultaneous speaking a great part of the transmission band is always connected through for the subscribers. The speaking subscriber thus will be able to hear each remark of the other subscriber with sufficient quality. Due to this, conversations via satellite connections can be made more fluent and with less check-backs, even in most undesirable conditions (for instance very different speech volume of the two subscribers at the echo suppressor) than with prior echo suppressors. Even connections via two-series connected satellite circuits are enabled by an echo suppressor constructed in accordance with the above principles.

Figure 2:
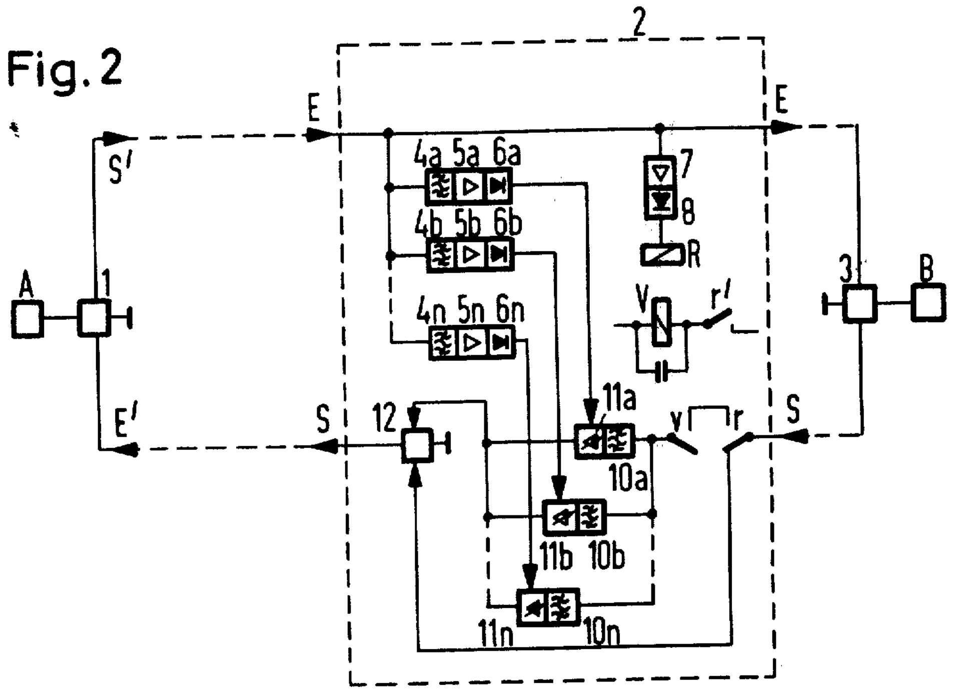
FIG. 2 is a schematic diagram of a telephone connection employing another embodiment of an echo suppressor according to the present invention.

As it is shown by the arrangement according to FIG. 2, the delay can also be provided and the delay line can be avoided by utilizing a second, delayed contact in the transmitting path. S When speech currents arrive in the receiving path B, here the switch-over contact r in the transmitting path S switches through at once to the first set of filters whereby the by-path for the first set of filters, which is utilized in a state of rest, and the regulating units arranged on the load side, are interrupted. The echo currents reach the filter outlets only then, when also the delay contact v of the delay relay V, which is controlled by the fast operating speech delay S, has operated to extend connection from the contact *r* to the set of filters. The relay V is, of course, connected to a suitable power supply by way of a second relay contact r' of the relay R.

Figure 3:
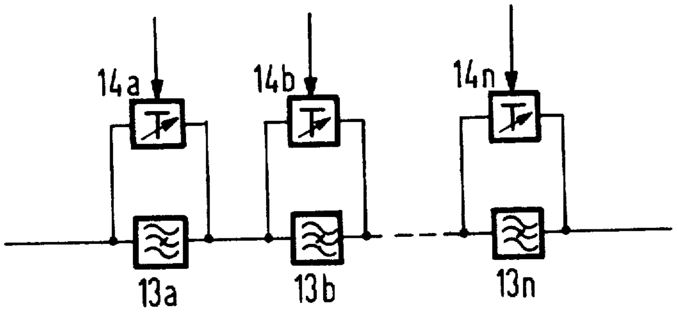
FIG. 3 is a schematic diagram of series-connected band suppressors which may be employed in the apparatus illustrated in FIGs. 1 and 2.

In FIG. 3 series-connected band suppressors (suppression or elimination filters) 13*a*, 13*b* . . . 13*n* are illustrated which, in the place of the parallel operating band pass filters according to FIGS. 1 and 2, may be inserted in the place of the first set of filters. Regulating units, for instance units 14*a*, 14*b*, . . . 14*n* are respectively connected in parallel to the band suppressors. The advantage of utilizing band suppressors in the first set of filters lies mainly in the fact that each individual echo oscillation cannot get into the transmission path by way of several parallel-connected paths on the transmitting side S. Control of the band suppressors is, however, somewhat more difficult than that of the band pass filters.

Figure 4:
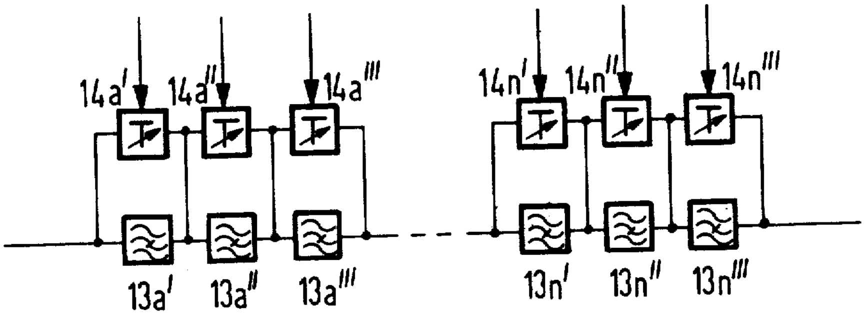
FIG. 4 is a schematic diagram of apparatus for facilitating the control of the band suppressors.

The arrangement illustrated in FIG. 4 is proposed to facilitate the control of the band suppressors. In this arrangement, the band suppressors on their part are replaced by several series-connected band suppression elements with approximately the same suppression range, having respective regulating units connected in parallel therewith. The band suppressors 13*a*, 13*b* . . . 13*n* for instance are realized by means of preseriesconnected band suppression elements 13*a*', 13*b*', 13*b*'', 13*b*''' 13*a*'', 13*a*''', . . . 13*n*', 13*n*'', 13*n*''' each having a respective partial regulating unit 14*a*', 14*b*', 14*b*'', 14*b*''', 14*a*'', 14*a*''', . . . 14*n*', 14*n*', 14*n*''', connected in parallel. With this arrangement, the attenuation from a given threshold value, will be controlled continuously in the respective partial frequency band in a way that the proportionality is approximated to the respective output levels of the band pass filters of the second set of filters.

Figure 5:
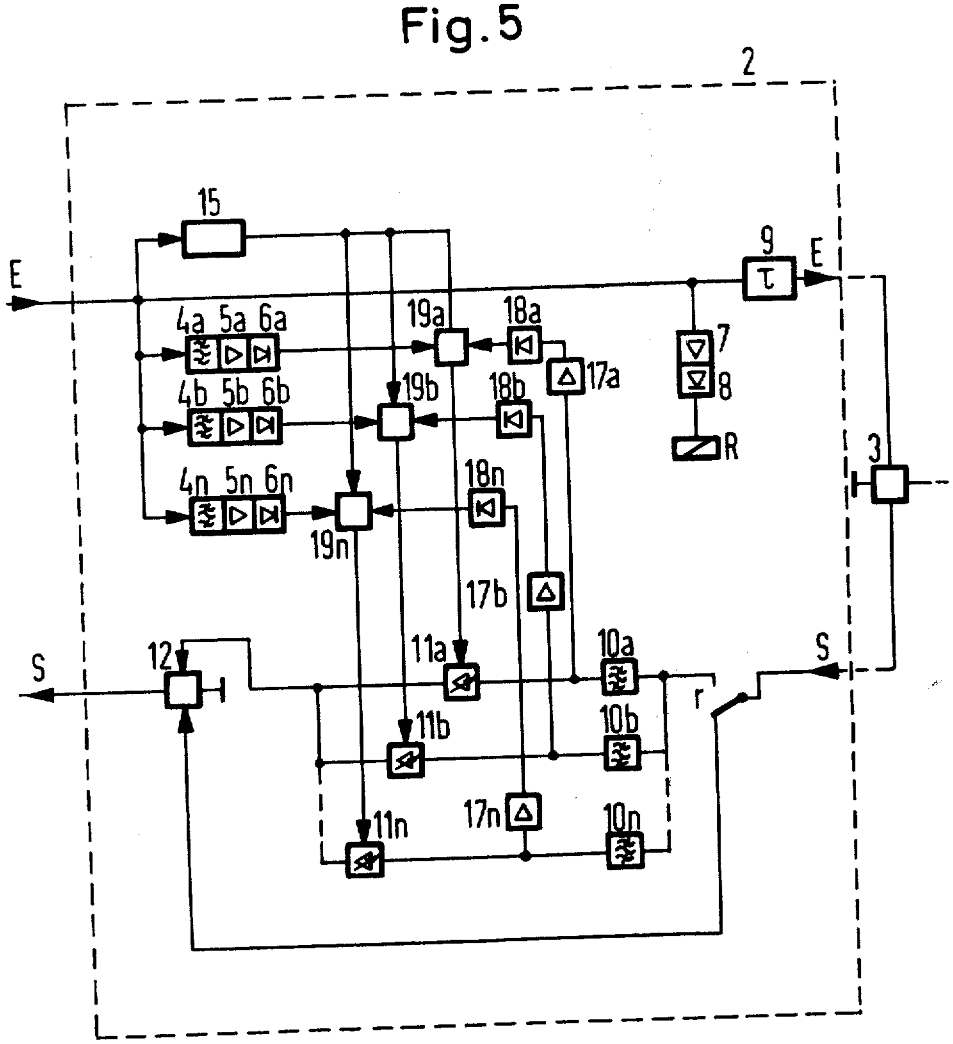
FIG. 5 is a schematic diagram of an embodiment of an echo suppressor according to the present invention.

FIG. 5 shows a further embodiment of the echo suppressor 2 according to this invention. Like in the arrangement according to FIG. 1, a delay line 9 is inserted into the receiving path E. Ahead of the delay line 9, the signals for the band pass filters 4*a*, 4*b*, . . . 4*n* of the second set of filters as well as the amplifiers 5*a*, 5*b*, . . . 5*n*, arranged respectively on the load side thereof, and the following rectifiers 6*a*, 6*b*, . . . 6*n*, are taken from the receiving path E.

Furthermore the input of the speech detector 7, 8 and the input of a threshold value control element 15 are connected at this branch point of the receiving path E. The speech detector 7, 8 controls the speech relay R which has a switch-over contact inserted ahead of the first set of filters into the transmitting path S. If there is no speech signal in the receiving path E, the contacts *r* switches the path of the transmitting signal S over the bridging line which is connected with the additional termination or two-four wire connection 12. In another case, the parallel operating band pass filters 1*a*, 10*b*, . . . 10*n* of the first set of filters lie in the transmitting path S. Each of these band filters of the first set of filters has a regulating unit 11*a*, 11*b*, . . . 11*n* connected in series, the outputs of the regulating units also connected with the two-four wire circuit 12. These regulating units 11*a*, 11*b*, . . . 11*n* are controlled respectively by a comparing device 19*a*, 19*b*, . . . 19*n*. These comparing devices are controlled respectively for each partial frequency band, from the receiving path E as well as from the transmitting path S. For instance, for the lowest partial frequency range, the control path from the receiving path guides over the band pass filter 4*a*, the amplifier 5*a* and the rectifier 6*a*, and from the transmitting path S over the band pass filter 10*a*, the amplifier 17*a* and the rectifier 18*a* to the comparing device 19*a*. For the comparing devices 19*b* through 19*n* which are responsible for the rest of the partial frequency ranges, the control is effected in an analog manner from the receiving path E and the transmitting path S. Thereby the comparing devices are designated in a way that, while the output signal of the band pass filter of the first set of filters is dominant, as opposed to that of the band pass filter of the same partial frequency range of the second set of filters, it is acted upon so that it adjust the path in the transmitting path for the respective partial frequency band to minimum attenuation. In particular if the speech energy in a partial frequency band comes mainly from the near subscriber B, the selective attenuation can be switched off, since at this instant the partial band energy of the near subscriber B covers the partial band energy of the distant subscriber A, and thus the echo of the distant subscriber A cannot be heard in this partial band. Therefore, the comparing device 19*a*, receives an input from a threshold value control element 15 to determine the response of the device with respect to incoming speech energies from the line E and compares the output of the rectifier 6*a* to the output of the rectifier 18*a* to determine which signal in the corresponding partial frequency bands is dominant and provides a control signal to the corresponding regulating unit to pass or suppress speech energy in that partial frequency band.

Due to this measure, the retransmission quality is essentially improved if the subscribers speak simultaneously. Therefore, the holdover time which is provided for the switching-off of the selective attenuation, is rendered inefficient at once by means of the speech currents for the near subscriber B for the period of the interruption. It is already possible then for the selective attenuation to be switched off, if the partial frequency band energy in the transmitting path is slightly smaller than that in the receiving path since, due to the transit attenuation in the two-four wire circuit 3, the echo is always weaker than the respective energy in the receiving path.

The comparing devices 19*a*, 19*b*, . . . 19*n* are additionally controlled by the output of the threshold control device 15. This threshold control device has the task of controlling the threshold value from which the attenuation in the respective frequency ranges is determined, so that the attenuation is nearly proportional to the selective levels in the receiving path E, such that the same is displaceable within certain limits. Thereby the threshold value can be lowered with low levels in the receiving path E, and with high levels the threshold value can be increased.

Figure 6:
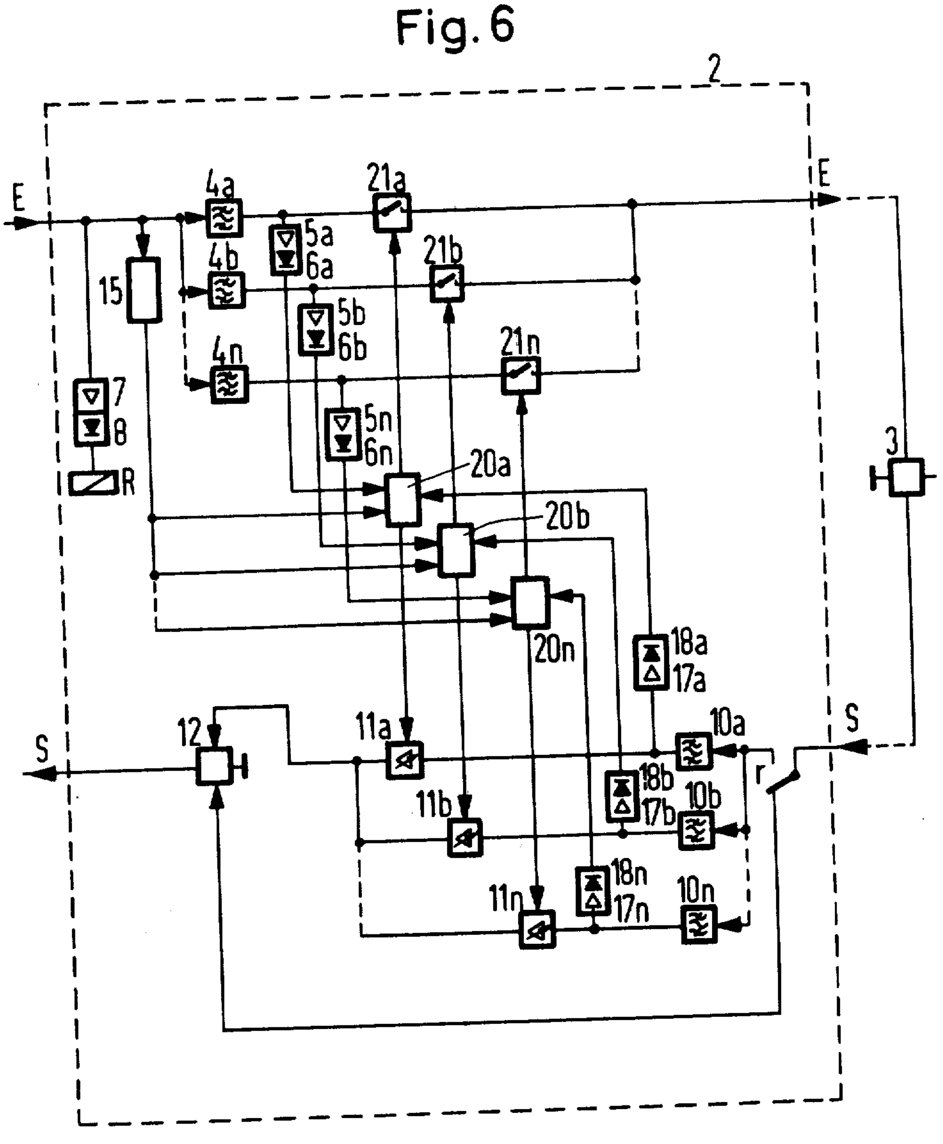
FIG. 6 is a schematic diagram of another embodiment of an echo suppressor according to the present invention.

An additional embodiment of the echo suppressor may be seen in FIG. 6. This arrangement is similar to the arrangement according to FIG. 5; the delay line 9 in the receiving path E, however, being replaced after a set of parallel-operating band pass filters 4*a*, 4*b*, . . . 4*n* by a corresponding plurality of switches 21*a*, 21*b*, . . . 21*n* arranged on the load side of the respective band pass filters. These switches are controlled from the comparing devices 20*a*, 20*b*, . . . 20*n* which are controlled in the same manner as the comparing devices 19*a*, 19*b*, . . . 19*n* in the arrangement according to FIG. 5, and which, on their part, control the regulating units 11*a*, 11*b*, . . . 11*n* in the transmitting path S.

When the threshold value is exceeded by the output level of one of the band pass filters 4*a*, 4*b*, . . . 4*n* of the second set of filters, the respective switch 21*a*, 21*b*, . . . 21*n* in the receiving path E is thereupon conditioned into the permeable state. Simultaneously, the proportional increase of the absorption in the respective partial frequency ranges of the transmitting path S is initiated. Since the charging-time constant of the rectifiers 6*a*, 6*b*, . . . 6*n* on the receiving side E has the same value as the charging-time constant of the rectifiers 18*a*, 18*b*, . . . 18*n* on the transmitting side S, the switches 21*a*, 21*b*, . . . 21*n* on the receiving side E, too do not beforehand transfer into the conductive state then when the regulating units 11*a*, 11*b*, . . . 11*n* on the transmitting side S are unable to attenuate the echo signal to the necessary value. Thus, it is insured that even short echo remainders can no longer return to the speaking subscriber A.

As it has been mentioned at the beginning, it is customary to insert an echo suppressor respectively at both ends of four-wire paths involving a delay time, with one transit respectively to a two-wire path. Therefore generally two similar echo suppressors will co-operate in the system. The echo suppressor described hereinbefore, according to this invention, however, can also successfully co-operate with other echo suppressors in a joint four-wire connection.

Figure 7A:
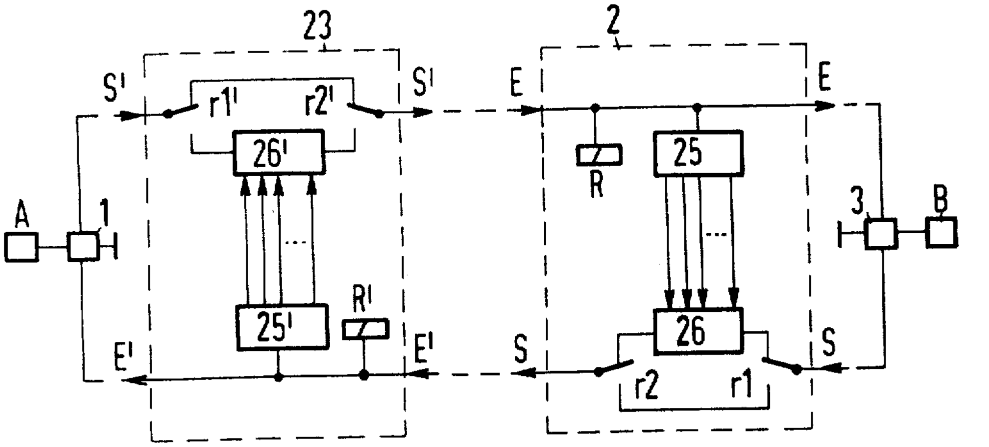
FIGS. 7*a*, 7*b* and 7*c* are schematic diagrams representing the principle of the present invention in a telephone connection respectively illusrating the different speech phases for the two subscribers.
Figure 7B:
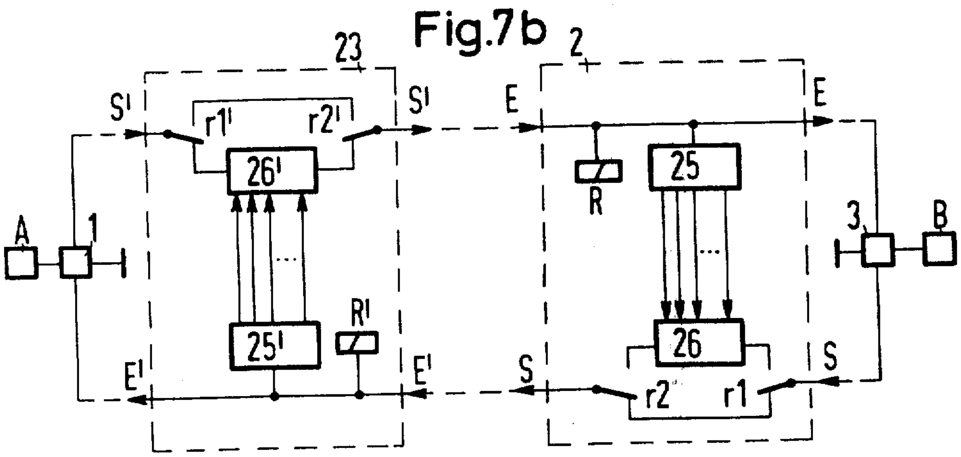
Figure 7C:
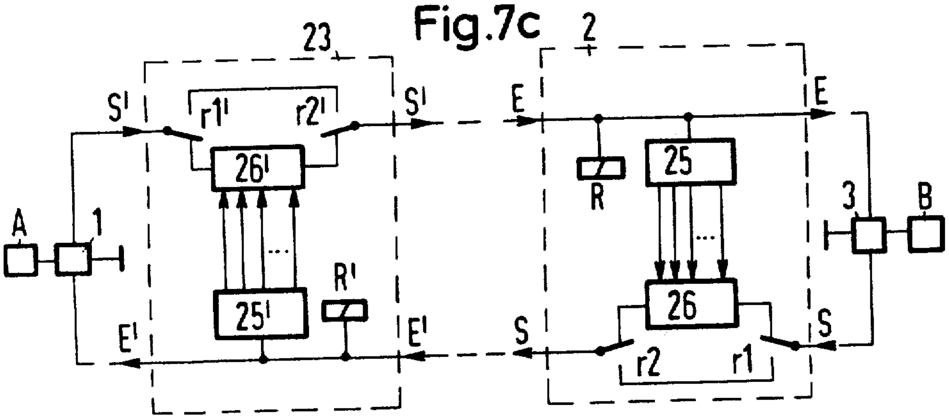
Figure 8:
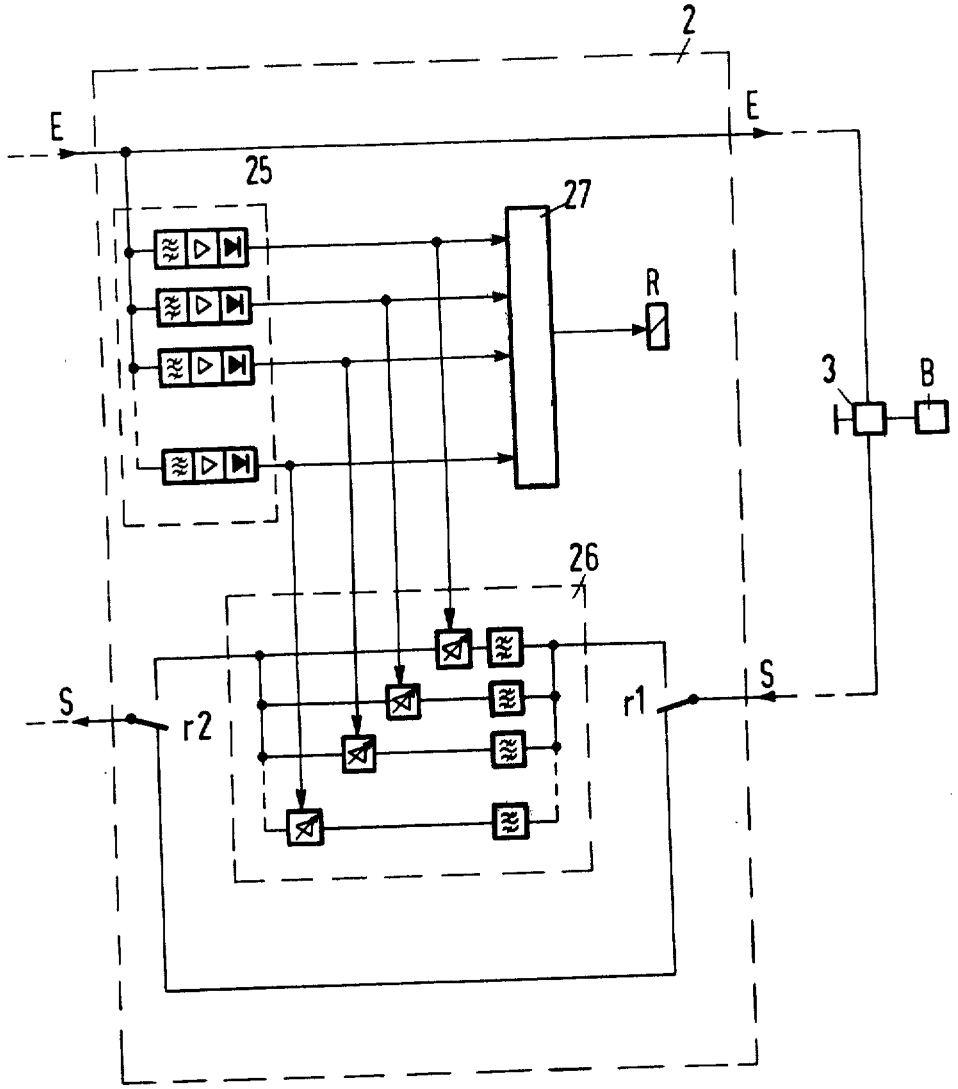
FIG. 8 is a schematic diagram of an embodiment of the echo suppressor of FIG. 7 according to the present invention.

FIGS. 7 and 8, illustrate an embodiment according to this invention in which a bridging line is assigned to a first set of filters 26, which bridging line, if no speech signal is present in the receiving path E is inserted in the place of the first set of filters 26, into the transmitting path S, with the help of a switch-over device R, *r*1, *r*2 which is controlled from the receiving path E. There is therefore obtained the situation that no selected means are inserted into the transmission path of the subscriber who is speaking alone. Even if both subscribers do not speak the respective sets of filters at both sides of the four-wire connection are bridged, so that the speech signal of the first starting subscriber does not suffer a delay. Since the time in which only one of the subscribers speaks, normally takes more than 95 percent of the entire length of the conversation, the advantage results that the transmission quality with the echo suppressor according to our invention, as opposed to the prior frequency selective echo suppressors, is not dependent upon any attenuation and phase distortions, as well as lowerings of the transmission quality during the greatest portion of the duration of the conversation.

The partial illustrations of FIGS. 7*a*, 7*b*, and 7*c* show in principle the three conversation phases of the telephone connection and FIG. 8 illustrates the detailed embodiment of the echo suppressor 2.

In FIGS. 7*a*, 7*b* and 7*c* the telephone connection (long distance) is illustrated with two echo suppressors for one conversation phase respectively of two subscribers. The telephone connection extends between the subscriber B and the two-four wire circuit 3, and between the subscriber A and the two-four wire circuit 1 over respective two-wire lines, and between the two-four wire circuits 1 and 3 over a four-wire line. Within the four-wire line, the echo suppressor 23 is inserted on the side near the subscriber A, and on the side near the subscriber B the echo suppressor 2 is inserted. Between the two echo suppressors 23 and 2 there is a relatively long transmission path which requires a transit time, for instance one or several satellite and/or sea cable sections. Between the echo suppressor 23 and the respective two-four wire termination circuit 1 and/or the echo suppressor 2 and the corresponding circuit 3, however, there may be relatively long-four-wire transmission paths.

Within the echo suppressor 2, a first set of filters 26 or a bridging line is inserted into the transmission path which is to be seen as transmitting path S with respect to the associated two-four wire circuits 3, depending on the position of the switch-over device R. The first set of filters 26 thereby is controlled selectively from the transmission path of four-wire connection which is to be seen as receiving path E with respect to the circuit 3. For this reason, a second set of filters 25 is connected at the input with the receiving path E and at the output with the first set of filters 26, which second set of filters consists preferably of band pass filters operating in parallel. The switch-over device is also controlled from the receiving path E; this device has been illustrated in the drawing as relay R with two switch-over contacts *r*1 and *r*2 for simplification.

Within the echo suppressor 23 the first set of filters 26' or a bridging line is inserted in an analog manner into the transmission path of the four-wire connection which is to be seen as the transmitting path S' with regard to the two-four wire circuit 1, according to the position of the switch-over device R'. Thereby the first set of filters 26' is controlled from the feeding path E' of the echo suppressor 23 over the second set of filters 25' at that location.

In FIG. 7*a* that phase of the conversation has been illustrated in which only the subscriber A is speaking. Since no speech signals arrives in the feeding path E' at the echo suppressor, not only the first set of filters 26' in the echo suppressor is controlled permeably over the second set of filters 25' in all partial frequency bands, but a bridging line is inserted in the place of the first set of filters 26' over the contacts *r*1' and *r*2'. The opposite case is given for the echo suppressor 2 at the listening subscriber B since the speech signal is received in the receiving path E as well as by the switch-over device R and by the second set of filters 25. The switch-over device controls contacts *r*1 and *r*2 and positions them so that the first set of filters 26 is inserted into the transmitting path S. In addition, the first set of filters 26 is conditioned into the permeable or suppressing state according to the instantaneous distribution of the energy in the individual partial frequency bands. In the transmission direction S'-B from the speaking subscriber A to the listening subscriber B, however, no selective means are inserted.

In FIG. 7*b* that phase of the conversation has been illustrated in which only the subscriber B is talking. Thus the bridging line is inserted into the transmitting path S in the echo suppressor 2 which is at the subscriber B's side in the place of the first set of filters 26, and the first set of filters 26' into the transmitting path S' in the echo suppressor 23 at the subscriber A's side of the connection. Even in this phase of the conversation no selective means are inserted into the transmission direction S-E′ from the speaking subscriber B to the listening subscriber A, this condition being the reverse of the condition illustrated in FIG. 7*a*.

In the short phases of the talks in which the subscriber A as well as the subscriber B is talking, the switching position is effective as it is shown in FIG. 7*c*. In this switching position the first set of filters 26′ is in the transmitting path S′ in the echo suppressor 23 and the first set of filters 26 in the transmitting path direction S in the echo suppressor 2. The respective partial ranges of the first sets of filters 26 and 26′ are conditioned into the permeable or suppressing or attenuating state respectively according to the energy distribution in the receiving path E or E′ associated therewith. In FIG. 8 a detailed embodiment of the echo suppressor 2 accordint to FIGS. 7*a*, 7*b* and 7*c* is illustrated. In this embodiment, the first set of filters 26 consists of a series of band pass filters operating in parallel which have, for instance, a band width of 300 hertz and which allow, when they are connected through, the transmission of nearly the entire speech frequency band. Each of these band pass filters has a continuously controllable regulating unit connected therewith in series. These regulating units may be amplifiers which have controlled amplification in accordance with the individual signal levels of the partial frequency ranges on the receiving line E, but they may also be attenuating members having in that case a joint amplifier connected in series. The second set of filters 25 is constructed similarly to the first set of filters 26, whereby each individual band pass filter has an amplifier and a rectifier connected in series therewith. The band pass filters of the second set of filters 25 are connected at their inputs to the receiving path E, and at their outputs each is individually connected by way of its associated rectifier for controlling the regulating unit corresponding to the same partila frequency band in the first set of filters 26.

Further more all rectifiers of the second set of filters 25 control jointly a selective evaluation device 27 for the switch-over device R. This device 27 evaluates the levels in the partial frequency bands separated or in groups which facilitates essentially the distinction between speech energy and disturbing energy or noise. Thus, the respective reaction thresholds can be lower and, if necessary, even differently high, so that the inserting of the first set of filters can be effected even faster and safer.

A pair of switch-over contacts *r*1 and *r*2 are provided as portions of the switch-over device R. In their rest position, the switchover contacts *r*1 and *r*2 connect the bridging line into the transmitting path S. If, however, each speech signal appears in the receiving path E, the switch-over device reacts, so that the contacts *r*1 and *r*2 insert the first set of filters 26 into the transmitting path S. In the place of the contacts *r*2 there can also be provided an additional two-four wire termination circuit as the output of the transmitting path S of the echo suppressor 2. Furthermore, the illustration of a relay for the switch-over device R is to be regarded as a simplified way of illustrating either a mechanical or an electronic circuit arrangement. Thereby the dimensioning of the switchover device R is effected in a manner that if a speech signal arrives at the receiving path E, the switch-over contacts *r*1 and *r*2 switch over at once to the first set of filters 26, remain, however, after the speech signal is ended in the receiving path, in this position for a certain amount of time, so that the echo signal comes from the receiving path E or the twofour wire termination circuit 3 into the receiving path S, is delayed by means of the transmit time and can still be prevented from reflecting back to the subscriber A by way of the regulating units of the first set of filters 26.

Furthermore the evaluation elements which consist of the amplifiers and the rectifiers of the second set of filters 25 and the regulating units of the first set of filters 26, are dimensioned in a way that the reset of the absorption in the respective partial frequency bands is also delayed for that hold-over time which corresponds to the transit time of the echo signal.

While the present invention has been disclosed herein by reference to specific illustrative embodiments thereof, many changes and modifications will become apparent to those skilled in the art without departing from the spirit and scope of the invention, and it is to be understood that I wish to include within the patent warranted hereon all such changes and modifications as may be reasonably and properly included within the scope of my contribution to the art.

What I claim as my invention is:

1. An echo suppressor for a speaking circuit of a fourwire transmission system having a transmitting path and a receiving path, comprising: a set of first filters connected in said transmitting path; a plurality of continuously controllable regulating means each of which is connected to and associated with a respective first filter to control signal passage therethrough; a set of second filters connected to said receiving path, each of said second filters having a partial frequency range covering a separate portion of the total frequency range of said second filters, and each of said first filters having a partial frequency range corresponding to that of a separate second filter; a plurality of signal evaluation elements each of which is connected between a respective second filter and the regulating means associated with its corresponding first filter and operable to control signal passage through said corresponding first filter in accordance with the level of speech signals in said receiving path which are within the corresponding partial frequency range; means for establishing an operation threshold for said plurality of evaluation elements, whereby attenuation is controlled in the respective partial frequency ranges proportionally with respect to signal levels above said threshold at the outputs of the respective second filters; and a speech detector connected to and controlled from the receiving path and a transfer device connected to said transmitting path and connected to and controlled by said speech detector to bridge and bypass said first filters if no speech signal is present in the receiving path.

2. An echo suppressor according to claim 1, wherein parallel-connected band pass filters are provided as said first filters having the respective regulating means connected in series.

3. An echo suppressor according to claim 2, wherein the first band pass filters are dimensioned in a way that they have a lower band width than the second band pass filters.

4. An echo suppressor according to claim 2, wherein the pass band characteristics of said first filters are dimensioned to have greater steepress than the pass band characteristics of said second filters.

5. An echo suppressor according to claim 2, comprising a comparing device for each partial frequency range each connected to and controlled by the output signal of the respective band pass filter of the first filters and the output signal of the respective band pass filter of the second filters for adjusting the regulating means for the same partial frequency band to a lower absorption during the time when the output level of the band pass filter of the first filters exceeds the output level of the respective band pass filter of the second filters or if it exceeds the other level which lies a certain given difference lower.

6. An echo suppressor according to claim 1, wherein series-connected band suppressors are provided as said first filters having the respective regulating means connected in parallel therewith.

7. An echo suppressor according to claim 6, wherein each band suppressor includes several band suppressor elements with nearly the same suppression range, having a partial regulating means connected parallel thereto.

8. An echo suppressor according to claim 1, wherein the partial frequency ranges overlap and the second band pass filters are dimensioned in a way that their attenuation is small in the overlapping areas of the partial frequency ranges.

9. An echo suppressor according to claim 1, comprising a second plurality of evaluation elements in said transmitting path, and wherein each of said evaluation elements has a delay such that the reset of the attenuation in the respective partial frequency bands of the first filters is delayed for a hold-over time which is at least as great as the transit time of the echo signal from the branching point of the receiving path for the second filters to said second plurality of evaluation elements in the transmitting path.

10. An echo suppressor according to claim 1, wherein the evaluation elements are dimensioned in a way that the reset of the attenuation in the respective partial frequency bands of the first filters during the hold-over time has an essentially higher magnitude than the hold-over time.

11. An echo suppressor according to claim 10, wherein each said comparing device is operable to adjust the corresponding regulating means to smaller or minimum attenuation, excluding the hold-over time, during the time when the output signal of the corresponding band pass of the first filters is dominant.

12. An echo suppressor according to claim 1, wherein said transfer device is dimensioned in a way that the inserting of the first filters is effected very fast and the inserting of the bridging line is effected delayed at least for that time which corresponds to the transmission time of the echo signal from the connection point of said speech detector to the receiving path up to the connection point of said transfer device in the transmitting path.

13. An echo suppressor according to claim 12 comprising an evaluation device connected to said second filters, and wherein said transfer device is controlled by said evaluation device which evaluates the levels in the individual partial frequency bands of the receiving path.

14. An echo suppressor according to claim 1, wherein said second filters are connected into the receiving path.

15. An echo suppressor according to claim 14, wherein each of the filters second set of filters has a switching element connected in series which is controlled by the respective evaluation element of the same partial frequency band.

16. An echo suppressor according to claim 1, comprising a delay element connected into the path of the echo signal between the branch point of the receiving path for the second filters and said second pluraliy of evaluation elements in the transmission path.

17. An echo suppressor according to claim 16, wherein said delay element is dimensioned in a way that the transit time of the echo signal between the branch point of the receiving path for the second filters and the evaluation elements in the transmitting path is at least as long as the reaction time of the evaluation elements.

18. An echo suppressor according to claim 16, wherein said delay element is at least partly constituted by means of said first filters.

19. An echo suppressor according to claim 16, characterized in that said delay element is a delay line which is connected into the receiving path.

20. An echo suppressor according to claim 16, characterized in that said delay element is connected into the transmitting path.

21. An echo suppressor according to claim 19, wherein said delay element is a further switching device which is connected ahead of said first filters and which is controlled by said speech detector to interrupt the signal path of the first filters when a speech signal disappears in the receiving path and to connect the signal path delayedly when the speech signal starts in the receiving path.

* * * * *